United States Patent

[11] 3,592,286

| [72] | Inventor | Curtis H. Johnson<br>San Marino, Calif. |
|---|---|---|
| [21] | Appl. No. | 857,086 |
| [22] | Filed | Sept. 11, 1969 |
| [45] | Patented | July 13, 1971 |
| [73] | Assignee | Western Geophysical Company of America<br>Houston, Tex. |

[54] METHOD OF SEISMIC PROSPECTING
10 Claims, 7 Drawing Figs.

[52] U.S. Cl. ........................................ 181/0.5,
340/7, 340/15.5
[51] Int. Cl. ........................................ G01v 1/00
[50] Field of Search ............................ 181/0.5 AP,
0.5 EC; 340/7, 15.5 TA, 15.5 TG

[56] References Cited
UNITED STATES PATENTS
3,496,532   2/1970   Thigpen ........................ 340/15.5

*Primary Examiner*—Rodney D. Bennett, Jr.
*Assistant Examiner*—Stephen Buczinski
*Attorneys*—Michael P. Breston, Alan C. Rose and Alfred B. Levine

ABSTRACT: A method of seismic prospecting whereby explosive charges are detonated at any desired depth and the bubble-pulse train is permitted to form without hindrance.

In a first embodiment of the invention the effects of the bubble are removed in the stage of processing of the recorded seismic data.

In a second embodiment, the characteristic pulse train produced by the bubbles is used to enhance the quality of the resulting seismic data.

PATENTED JUL 13 1971  3,592,286

Curtis H. Johnson
INVENTOR

BY  Michael P. Breston
ATTORNEY

METHOD OF SEISMIC PROSPECTING

BACKGROUND OF THE INVENTION

It is well known in the seismic art that the acoustic or seismic energy available from the detonation of an explosive charge (or more generally from any impulsive source) increases if the detonation or source is confined under pressure, i.e., tamped. Thus, for example, in seismic operations upon land, a hole is drilled in the earth, a charge is placed in the bottom of the hole, and the hole is filled with sand, water, or mud prior to the detonation of the explosive. The column of fill material acts as a tamp upon the charge and greatly increases the proportion of chemical energy converted into seismic energy. Ratios of seismic energy transmitted into the ground as between tamped and untamped charges may be as high as 50 to 1 or more.

To achieve the desirable effect of increased confining pressure in a seismic exploration survey at sea, it is necessary to detonate explosive charges as sources of seismic energy at an appreciable depth. However, the resulting gaseous products of the explosion produce an expanding bubble which begins a sequence of alternate bubble contractions and expansions which results in the production of bubble pulses, as is well known in the seismic art and is more particularly described in the book *Underwater Explosion* by Cole, 1948, Princeton University Press and in U.S. Pat. No. 2,622,691.

Each of these bubble pulses in turn acts as a separate source of seismic energy with the net result that the seismic signal emitted from the explosion appears as a series of successive pulses rather than in the desirable situation in which only one pulse is emitted. To avoid this effect during seismic exploration at sea it has been customary to detonate explosive charges as sources of seismic energy near the sea surface in order that the gaseous products of the explosion be vented immediately to the atmosphere.

Because shallow placement of explosives in water necessarily implies relatively low tamping (i.e., the confining pressure of the water is low), explosives so used constitute a relatively inefficient source of seismic energy.

Use of explosives at considerable depths in water has been confined in the field of seismic exploration to the area of exploration by the seismic refraction technique in which only the first arrival of energy is studied. In the seismic reflection technique, on the other hand, in which the entire train of returned seismic energy is required for the proper conduct and ultimate interpretation of the survey, charges have not been lowered sufficiently deep beneath the sea surface because of the confusion in the interpretation of the returned seismic energy which would be caused by the successive impulses from the train of bubbles produced by the successive contraction and expansion of the gaseous products of the explosion.

One prior art method which has successfully coped with the bubble pulse problem is the method exemplified by the Flexotir process of Compagnie General de Geophysique of France and more particularly described in the U.S. Pat. No. 3,368,641, which in turn is an embodiment of a more basic method believed to have been developed by Standard Oil Company of California. In this method of the prior art the explosives are detonated deep under water within a perforated cage. The perforated cage permits the initial shock wave to be emitted but, by slowing the subsequent inflow of water the cage prevents the rapid collapse of the first bubble. While this method of the prior art may be successful with relatively small charges, relatively large perforated cages are needed to suppress bubbles produced by relatively large charges. In addition, the cage acts as a partial damper of the desired seismic energy, requires additional towing force, and is relatively costly.

SUMMARY OF THE INVENTION

In accordance with a broad aspect of the method of the present invention, explosive charges are detonated at any desired depth and the bubble-pulse train is permitted to form without hindrance.

In a first embodiment of the invention the effects of the bubble are removed in the stage of processing of the recorded seismic data.

In a second embodiment, the characteristic pulse train produced by the bubbles is used to enhance the quality of the resulting seismic data.

To practice the method of this invention, a bubble containing a high-pressure expanding volume of gas is established at a sufficient depth to prevent the gas from directly venting to the atmosphere. The initial expansion of the gas bubble creates in the water an initial acoustic impulse for subsequent reflection from the subbottom strata. The gas bubble subsequent to the initial expansion collapses and again expands to create in the water at least a first bubble acoustic impulse for subsequent reflection from the subbottom strata. The reflections from the initial acoustic impulse and from the first bubble acoustic impulse are detected to provide a seismic wave train. An operator is then constructed from a characteristic of the first bubble acoustic impulse, and the seismic wave train is operated on by the operator. Preferred operators and their manner of construction are described.

BRIEF DESCRIPTION OF THE DRAWINGS

Referring now to FIGS. 1 through 3, there is shown a firing system for establishing in a water body a bubble containing a high-pressure expanding volume of gas at a sufficient depth to prevent the gas from directly venting to the atmosphere. The preferred firing system forms no part of this invention and is described in copending patent application Ser. No. 832,727. For an understanding of this invention, however, a brief description of the system will be given hereinafter.

Figure 1:
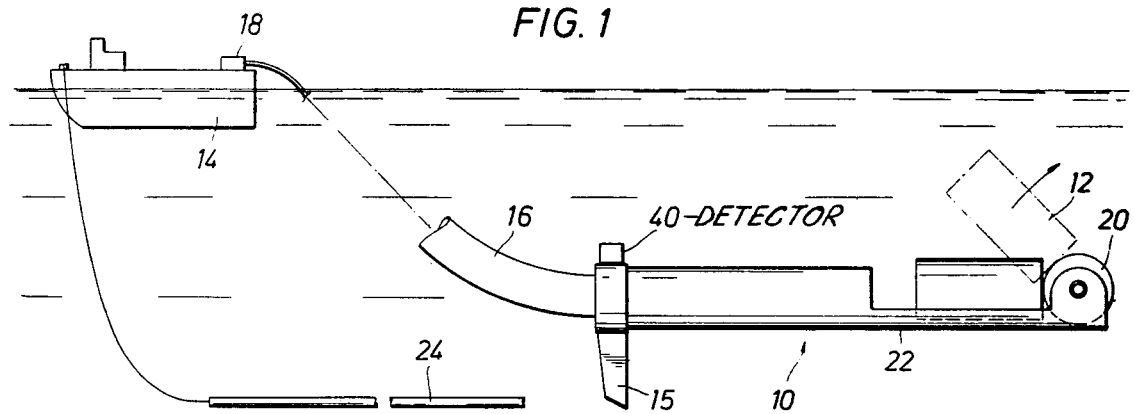
FIG. 1 shows a system for establishing under water a bubble containing a high-pressure, expanding volume of gas.
Figure 2:
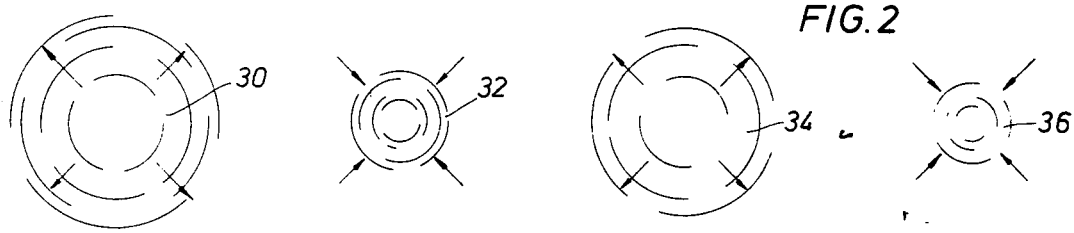
FIG. 2 illustrates the initial and subsequent expansions and contractions of the gas bubble.

A charge launcher 10 is adapted to receive percussion initiable, explosively operated charges 12. Each charge 12 includes a delay fuse which causes the charge to detonate at a distance removed from launcher 10. Launcher 10 is towed by a seismic boat 14 at a predetermined depth below the air-water surface. The directional stability of launcher 10 is maintained by suitable paravanes 15. A flexible conduit 16 couples a charge loader 18 on deck of boat 14 to the charge launcher 10. Conduit 16 allows the charges 12 to pass therethrough under the propulsion of water pressure.

By way of illustration of the operation of the known charge launcher 10, the launcher is towed beyond the seismic boat 14 at 6 to 10 knots per hour at a depth which may range from 20 to 50 feet below the water surface. An operator successively causes each charge 12 to move under water pressure to the charge launcher 10. When charge 12 reaches the end of its trajectory, its motion is arrested by a percussion element 20 which strikes the firing pin in charge 12 to thereby actuate the primer in charge 12. Charge 12 is then ejected from launcher 10 by the flow of water under pressure between the charge and the wall 22 of launcher 10. The detonation of the ejected charge 12 is delayed by the time delay fuse until a distance of say 7 to 10 feet is established between the initiated charge and the moving launcher 10.

After the detonation, the chemical energy in charge 12 is suddenly converted into kinetic energy of a rapidly expanding gas. There is thus established in the water body a bubble 30 containing a high-pressure expanding volume of gas. Because gas bubble 30 is positioned at a depth of say 30 to 50 feet, gas bubble 30 cannot directly vent to the atmosphere. The gas bubble 30 undergoes a very fast initial expansion which causes the surrounding water to become suddenly strongly compressed. The compression of the water creates the desired initial acoustic impulse 30' (FIG. 3) which is radiated outwardly throughout the body of water for subsequent reflection from the subbottom strata.

Subsequent to its initial expansion, gas bubble 30 collapses, in a well-known manner, into a contracted gas bubble 32. Bubble 32 then expands into a gas bubble 34. The expansion of bubble 34 creates in the water a first bubble acoustic impulse 34' which is radiated outwardly throughout the water medium. The first impulse 34' also becomes reflected from the subbottom strata. Thereafter bubble 34 collapses into a contracted gas bubble 36 which then undergoes a third expansion, etc.

The entire sequence of gas bubble expansions and contractions forms a pulse train of acoustic impulses.

One technique for detecting this pulse train is to employ a suitable detecting device 40 such as a pressure transducer or hydrophone, and position it as near as practicable to the explosive charge 12. The placement of detector 40 relative to launcher 10 is governed by the ability of detector 40 to withstand the large overpressures generated in the water by the explosions following the detonations of charges 12, and the ability of detector 40 to reproduce faithfully the pressure waveform generated by the explosion of charge 12. Detector 40 is therefore placed sufficiently far from the place of detonation so that it is not damaged or overdriven by the detonation.

Figure 4:
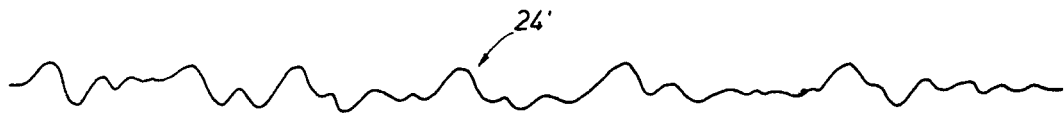
FIG. 4 shows the received seismic wave train.

Detector 40 transmits to a recorder on deck of boat 14 the time of occurrence of each of the successive bubble acoustic impulses and also, if possible, the amplitudes and the pulse shapes of the initial pulse and of the first and subsequent pulses. A recording is made of the sequence of pulses received by detector 40, preferably by the conventional seismic recording equipment and simultaneously with the recording of the detected seismic signals corresponding to the reflected signals from the subbottom strata. The reflected seismic signals are detected by a conventional seismic streamer cable 24 which provides a seismic wave train 24', as shown in FIG. 4.

Figure 3:
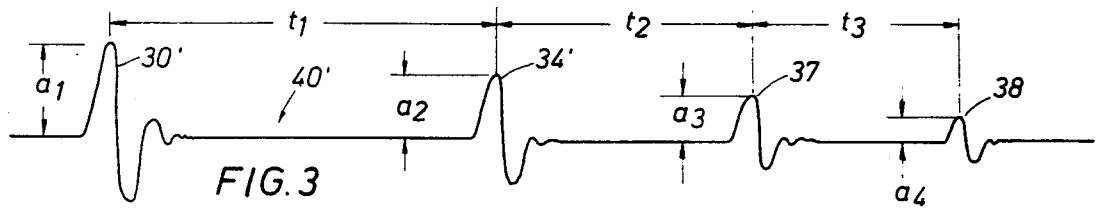
FIG. 3 is a bubble pulse train corresponding to the bubble expansions.

In FIG. 3 is shown a typical recording of a bubble pulse train 40' such as is provided by detector 40. As previously mentioned, the initial expansion of bubble 30 creates a relatively large initial pulse 30'. The second expansion of bubble 34 creates a first bubble pulse 34', the third bubble expansion creates a second bubble pulse 37, the fourth bubble expansion creates a third bubble pulse 38, etc. Simultaneously with the recording of the bubble pulse train 40' there is recorded on the seismic recording equipment the seismic wave train 24'.

It will be appreciated that the bubble pulse train 40' may be deduced from the conventional seismic data recorded in the conventional fashion by studying the direct arrival seismic signals at each detector group in streamer 24. This can be accomplished by adjusting the origin times of the recordings obtained from the plurality of seismic detector groups so that all first arriving signals are simultaneous. Otherwise expressed, this technique depends on removing the direct-arrival moveout from the individual traces, one trace for each detector group. All the traces are then summed. Random noise will tend to be cancelled in such a sum while the initial pulse and the following bubble pulses will tend to reinforce so that the sum trace will be a reasonably faithful reproduction of the pulses forming pulse train 40'.

In any event for each detonation of charge 12, a bubble pulse train 40' is recorded or established from which a tabulation is made of the time intervals between each bubble pulse relative to the initial pulse. For example, the time interval between the first bubble pulse 34' and the initial pulse 30' is $t_1$, the time interval between the second bubble pulse 37 and the first bubble pulse 34' is $t_2$, etc. If possible, although not essential for carrying out the preferred methods of this invention, a tabulation is also made of the amplitude ratios of each bubble pulse relative to the amplitude $a_1$ of the initial pulse 30', i.e., the amplitudes $a_2$, $a_3$, $a_4$, etc., are measured and the ratios $a_2/a_1$, $a_3/a_1$, etc., are determined.

Figure 5:
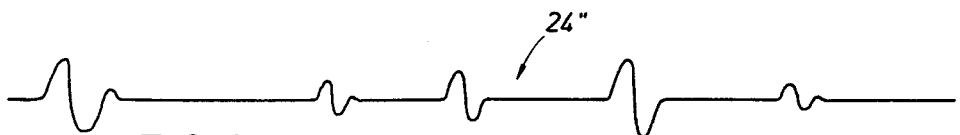
FIG. 5 shows the desired seismic wave train.

In accordance with a broad aspect of the present invention, there is constructed an operator from a characteristic of the first bubble pulse 34' and the seismic wave train 24' is operated on with this operator to obtain a desired seismic wave train 24'' (FIG. 5) which could have been detected by streamer cable 24 if the pulse train 40' consisted of a single pulse such as the initial pulse 30'.

Figure 6:
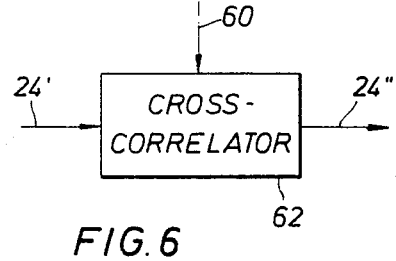
FIG. 6 illustrates a processing system using a cross-correlator.

In a first embodiment as shown in FIG. 6, the bubble pulse train 40' is used to construct a correlation operator 60 which operates in a cross correlator 62 on the seismic wave train 24'. In other words, the bubble pulse wave train 40' consisting of the initial pulse 30' end of the following bubble pulses 34', 37, 38, etc., is cross correlated against the received seismic wave train 24' in exactly the same manner as the variable-frequency input signal is cross correlated against the received signal in the well-known Vibroseis method. The output of cross correlator 62 produces the desired seismic wave train 24''.

Alternatively, the correlation operator 60 may consist of a single value for the initial pulse 30' and corresponding single values for each of the following bubble pulses. These values are spaced in time and have a magnitude in accordance with the above-described tabulation. Such an operator is known as a discrete, time delay operator.

Either correlation operator 60 or the discrete time-delay operator may be validly applied to the received seismic wave train 24' because the bubble pulse train 40' is not periodic. That is, the time intervals between pulses emitted by successive bubble expansions and their corresponding amplitudes change as characterized in FIG. 3.

Figure 7:
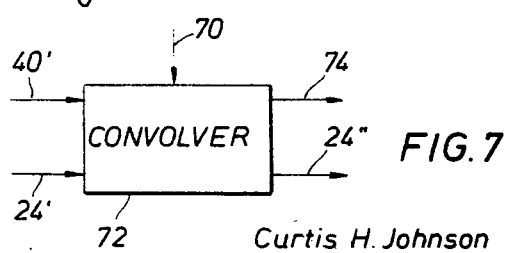
FIG. 7 illustrates a processing system using a convolver.

In another embodiment, as shown in FIG. 7, a more involved operator 70 may be constructed from the inverse to the bubble pulse train 40' in the well-known Wiener sense and applying this Wiener operator to the detected seismic wave train 24' in a convolver 72 by the convolution process. In the construction of an inverse filter, as is well known in the art of communication theory, an operator 70 is constructed which converts a given, observed waveform to a desired output waveform 74. Operator 70 is constructed as the inverse Fourier transform of the quotient of the complex spectra of the observed and desired waveforms. For example, in the seismic method herein described, the observed waveform could be the bubble pulse train 40' and the desired waveform could be an impulse, a Ricker wavelet or a minimum phase wavelet having a conventional, restricted band amplitude spectrum. The steps to be followed are well known in the art of processing or analysis of stationary time series. Accordingly, the received seismic wave train 24' is processed by convolver 72 to provide the desired wave train 24''.

In yet another embodiment, through data processing techniques available to the seismic processing art, it is possible to compress the bubble pulse train 40' into the initial pulse 30' to produce the effect of an enhanced single pulse source and hence the desired seismic waveform 24''.

One technique for carrying out this embodiment is as follows: remove the bubble sequence from the original seismic trace 24' in accordance with any of the embodiments previously described to form a processed Trace 24''; subtract processed Trace 24'' from the original Trace 24' to obtain a Bubble Trace A which now contains only the reflected signals from the bubble pulse sequence; assume that the first bubble is equivalent to an initial pulse and with this assumption process the Bubble Trace A in accordance with any of the embodiments previously described to remove all subsequent bubble pulses and thereby to obtain a Processed Trace B which will contain only the reflected signals from the first bubble pulse;

time shift Processed Trace B by time $t_1$ which will align the reflections from the first bubble pulse with those from the initial pulse on processed Trace 24'', and add time-shifted Trace B to processed Trace 24'' to enhance the reflected signals from the initial pulse. This process can then be repeated for each subsequent bubble pulse to further enhance the reflected signals from the initial pulse.

What I claim is:

1. A method of marine seismic prospecting comprising the steps of:
   establishing a bubble containing a high-pressure expanding volume of gas at a sufficient depth to prevent the gas from directly venting to the atmosphere;
   the initial expansion of said gas bubble generating in the water a desired initial acoustic impulse for subsequent reflection from the subbottom strata;
   said gas bubble subsequent to said initial expansion collapsing and again expanding to create in the water at least a first bubble acoustic impulse which also becomes reflected from said subbottom strata;
   detecting the reflected signals from said initial impulse and said first impulse to provide a seismic wave train; 24'';
   constructing an operator from a characteristic of said first impulse, and
   operating on said seismic wave train with said operator.

2. The method of claim 1 wherein,
   said gas bubble subsequent to said first impulse undergoes a series of expansions and contractions thereby creating in the water a sequence of bubble impulses forming a bubble pulse train which also becomes reflected from said subbottom strata, and
   said operator is constructed from a characteristic of at least said first impulse relative to said initial impulse.

3. The method of claim 1 wherein,
   said operator substantially removes from said wave train the reflected signals from said first bubble impulse.

4. The method of claim 2 wherein, said operator substantially removes from said wave train the reflected signals from said bubble pulse train.

5. The method of claim 2 wherein,
   said operator substantially removes from said wave train the reflected signals from said first impulse and from a subsequent bubble impulse in said pulse train.

6. The method of claim 1 and further including the step of:
   detecting said initial impulse and at least said first impulse to obtain a bubble pulse train.

7. The method of claim 6 and further including the step of:
   measuring the time interval between the detected initial and first impulses.

8. The method of claim 7 wherein,
   said operator is constructed by using said time interval, and said operating step includes the step of cross correlating said bubble pulse train with said seismic wave train thereby removing the effect of the reflected signals corresponding to said first impulse.

9. The method of claim 6 wherein,
   said operator is an inverse operator constructed by inverting said bubble pulse train to a preselected waveform, and
   said operating step includes the step of inverse filtering said seismic wave train with said inverse operator.

10. The method of claim 6 wherein,
    said operating step includes the step of compressing said bubble pulse train into said initial pulse thereby producing the effect of an enhanced single pulse source.

UNITED STATES PATENT OFFICE
CERTIFICATE OF CORRECTION

Patent No. 3,592,286            Dated July 13, 1971

Inventor(s) Curtis H. Johnson

It is certified that error appears in the above-identified patent and that said Letters Patent are hereby corrected as shown below:

Column 5, line 22, cancel "24";".

Signed and sealed this 12th day of December 1972.

(SEAL)
Attest:

EDWARD M. FLETCHER, JR.           ROBERT GOTTSCHALK
Attesting Officer                 Commissioner of Patents